(12) United States Patent
Yoon et al.

(10) Patent No.: US 10,329,434 B2
(45) Date of Patent: Jun. 25, 2019

(54) METHOD FOR PREPARING GRAPHENE-CONTAINING INORGANIC COATING COMPOSITION FOR COATING NON-FERROUS METAL OBJECTS AND GRAPHENE-CONTAINING INORGANIC COATING COMPOSITION PREPARED THEREBY

(71) Applicants: Woong Tae Yoon, Bucheon-si (KR); Sang An Kim, Incheon (KR)

(72) Inventors: Woong Tae Yoon, Bucheon-si (KR); Sang An Kim, Incheon (KR)

(*) Notice: Subject to any disclaimer, the term of this patent is extended or adjusted under 35 U.S.C. 154(b) by 0 days.

(21) Appl. No.: 15/680,389

(22) Filed: Aug. 18, 2017

(65) Prior Publication Data

US 2019/0055415 A1     Feb. 21, 2019

(51) Int. Cl.

| | | |
|---|---|---|
| *C09D 121/00* | (2006.01) |
| *C09D 5/22* | (2006.01) |
| *C09K 11/59* | (2006.01) |
| *C09K 5/14* | (2006.01) |
| *C23C 30/00* | (2006.01) |
| *B82Y 30/00* | (2011.01) |
| *B82Y 40/00* | (2011.01) |
| *C08K 3/013* | (2018.01) |

(52) U.S. Cl.
CPC ............. *C09D 5/22* (2013.01); *C09D 121/00* (2013.01); *C09K 5/14* (2013.01); *C09K 11/592* (2013.01); *C23C 30/00* (2013.01); *B82Y 30/00* (2013.01); *B82Y 40/00* (2013.01); *C08K 3/013* (2018.01); *Y10S 977/734* (2013.01); *Y10S 977/753* (2013.01); *Y10S 977/892* (2013.01)

(58) Field of Classification Search
None
See application file for complete search history.

(56) References Cited

FOREIGN PATENT DOCUMENTS

| KR | 10-1007507 B1 | 1/2011 |
| KR | 10-1180343 B1 | 9/2012 |
| KR | 101405322 B1 * | 6/2014 |

OTHER PUBLICATIONS

Geun et al (KR 10-1405322) Machine Translation (Year: 2014).*
Geun et al (KR 10-1405322) English Abstract (Year: 2014).*

* cited by examiner

*Primary Examiner* — Colin W. Slifka
(74) *Attorney, Agent, or Firm* — Novick, Kim & Lee, PLLC; Jae Youn Kim

(57) ABSTRACT

The present invention relates to a method for preparing a graphene-containing inorganic coating composition for coating non-ferrous metal objects and a graphene-containing inorganic coating composition prepared thereby, in which the inorganic coating composition contains liquid silica sol that emits far-infrared rays and powdery graphene that has very excellent thermal conductivity, and thus it emits far-infrared rays beneficial to the human body while having excellent durability and thermal conductivity. The method comprises: adding isopropyl alcohol as a solvent to liquid silica sol and a liquid sealant, followed by uniform stirring for 2-3 hours, thereby preparing a first liquid binder; adding powdery graphene, filler and pigment to the first liquid binder, followed by stirring for 8-10 hours, thereby preparing a second binder; and adding a predetermined amount of an adhesion-enhancing agent to the second binder, followed by aging at a temperature of 25 to 32° C. for 9 to 11 hours.

1 Claim, 4 Drawing Sheets

METHOD FOR PREPARING GRAPHENE-CONTAINING INORGANIC COATING COMPOSITION FOR COATING NON-FERROUS METAL OBJECTS AND GRAPHENE-CONTAINING INORGANIC COATING COMPOSITION PREPARED THEREBY

BACKGROUND OF THE INVENTION

Field of the Invention

The present invention relates to a graphene-containing inorganic coating composition for coating non-ferrous metal objects and a graphene-containing inorganic coating composition prepared thereby. More particularly, the present invention relates to a highly functional inorganic coating composition for coating non-ferrous metal objects, in which the inorganic coating composition contains a mixture of liquid silica sol that emits far-infrared rays and powdery graphene that has very excellent thermal conductivity, and thus the composition emits far-infrared rays beneficial to the human body while having excellent durability and thermal conductivity.

Description of the Prior Art

In general, a cylindrical metal tube constituting the body of a hairbrush, or a metal heat transfer plate in a hair iron, is made of a lightweight, highly conductive non-ferrous aluminum metal. Furthermore, the surface of the cylindrical metal pipe of the hairbrush or the heat transfer plate of the hair iron is coated with heat-resistant coatings having various colors.

However, in a conventional case in which thermal-resistant coatings are spray-coated on metal pipes and heat transfer plates, these coatings are merely decorative coatings that decorate the non-ferrous metal surface with various colors. Therefore, these coatings cannot exhibit the effect of increasing the durability and thermal conductivity of the non-ferrous metal objects or emitting far-infrared rays beneficial to the human body.

In the prior art, Korean Patent No. 10-1180343 discloses an aqueous coating composition for coating non-ferrous metals, and a method of fabricating a non-ferrous case using the same (Prior Art 1), and Korean Patent No. 10-1007507 discloses an anticorrosive coating composition for coating non-ferrous metal and steel structures, and an anticorrosive coating process using the same (Prior Art 2).

Prior Art 1 is an aqueous coating composition for coating non-ferrous metals, the composition containing: 100 parts by weight of a water-dispersible polyurethane acrylic resin containing a carboxylic acid group; 0.1 to 100 parts by weight of a cross-linking agent selected from among polyaziridine, melamine resin, or a combination thereof; and 0.1 to 10 parts by weight of an additive.

Prior Art 2 is an anti-corrosive coating composition for coating non-ferrous metal and steel structures, the composition comprising zinc or iron oxide, epoxy resin, a polyglycidyl compound, silica, zirconium, alumina, and an alicyclic amine compound, wherein the epoxy resin comprises bisphenol F type epoxy resin, novolac epoxy resin, dimer fatty acid-modified epoxy resin, and silicate-modified epoxy resin.

Prior Art 1 is intended to provide a coating composition containing a water-dispersible polyurethane acrylic resin as a base resin, in which the coating composition is used to form on a non-ferrous metal substrate a coating layer that does not generate volatile organic compounds (VOLCs) while not reducing its physical properties. Prior Art 2 is intended to provide a composition containing various epoxy resins, a polyglycidyl compound and the like in an optimum ratio, in which the composition is used to prevent the surface corrosion or erosion of a non-ferrous metal structure. Thus, Prior Art 1 and Prior Art 2 neither disclose nor suggest a mixture of liquid silica sol and powdery graphene, which is disclosed in the present invention and has the effect of increasing the durability and thermal conductivity of the entire surface of non-ferrous metal objects or emitting far-infrared rays beneficial to the human body.

SUMMARY OF THE INVENTION

The present invention has been made keeping in mind the above-described problems, and it is an object of the present invention to provide a method for preparing a graphene-containing inorganic coating composition for coating non-ferrous metal objects and a graphene-containing inorganic coating composition prepared thereby, in which the graphene-containing inorganic coating composition contains a mixture of a liquid silica sol, a liquid sealant, powdery graphene and a powdery filler, which can exhibit the effects of increasing the durability and thermal conductivity of the non-ferrous metal object and emitting far-infrared rays beneficial to the human body.

To achieve the above object, the present invention provides a method for preparing a graphene-containing inorganic coating composition for coating non-ferrous metal objects, the method comprising:

adding isopropyl alcohol as a solvent to liquid silica sol and a liquid sealant, followed by uniform stirring for 2 to 3 hours, thereby preparing a first liquid binder;

adding powdery graphene, a powdery filler and a powdery pigment to the first liquid binder, followed by stirring for 8 to 10 hours, thereby preparing a second binder; and adding a predetermined amount of an adhesion-enhancing agent to the second binder, followed by aging for 9 to 11 hours.

The present invention also provides a graphene-containing inorganic coating composition for coating non-ferrous metal objects, the composition comprising: 33 to 37 wt % of liquid silica sol; 28 to wt % of a powdery sealant; 19 to 21 wt % of liquid isopropyl alcohol; 6 to 8 wt % of powdery graphene; 4 to 6 wt % of a powdery filler; and 2 to 4 wt % of a powdery pigment.

DETAILED DESCRIPTION OF THE INVENTION

Figure 1:
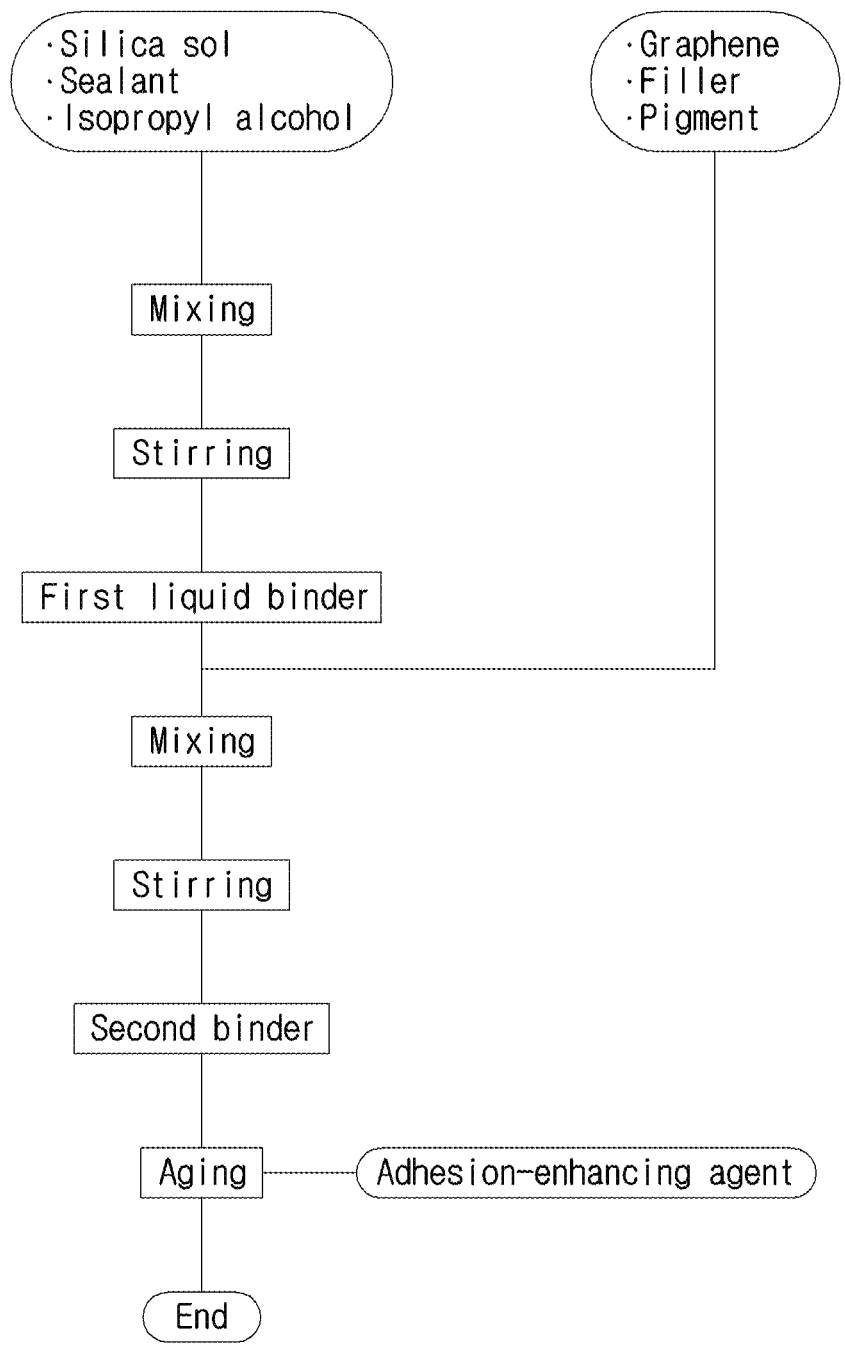
FIG. 1 is a flow chart showing sequential steps for preparing a composition according to the present invention.

Hereinafter, a preferred embodiment of the present invention will be described in further with reference to FIG. 1 which is a flow chart.

Embodiment

Isopropyl alcohol as a solvent is added to liquid silica sol and sealant in an agitator, and the mixture is uniformly stirred for 2 to 3 hours to prepare a first liquid binder.

The silica sol that is used in the present invention is a colloidal solution in which silicic acid ($SiO_2.nH_2O$) nanoparticles are dispersed. It is environmentally friendly and has the property of emitting far-infrared rays and anions beneficial to the human body.

The sealant that is used in the present invention is a liquid sealing material. Specifically, it is a reactive rubber composition that is used to enhance the adhesion between materials.

Next, powdery graphene, a powdery filler and a powdery pigment are added to the first liquid binder, and the mixture is stirred for 8 to 10 hours in the agitator to prepare a second binder.

The powdery graphene that is used in the present invention is a functional material having an atom-sized honeycomb structure made of carbon atoms. The powdery graphene is characterized in that it is 0.2 nm or less in size, is highly transparent, shows an electron mobility that is at least 100 times higher than that of copper at room temperature to make it possible to transfer a large amount of current rapidly, and has a thermal conductivity that is at least 2 times higher than that of diamond. In addition, the powdery grapheme has a mechanical strength that is at least 200 times higher than that of steel, but is highly flexible so that it does not lose its electrical conductivity even when being stretched or folded.

The filler that is used in the present invention is fine powder of graphite, asbestos, mica, zinc, zinc oxide, calcium oxide, molybdenum sulfide or the like. The filler is used in order to improve the impact resistance, heat resistance, abrasion resistance and electrical insulation properties of the coated non-ferrous metal object.

The pigment that is used in the present invention is used to enable the coated surface to have various colors. In the present invention, a thermochromic pigment (thermopaint) is used which changes color at a temperature of 40 to 70° C.

Next, the second binder is aged at a temperature of 25 to 32° C. for 9 to 11 hours, thereby preparing an inorganic coating composition for coating nonferrous metal objects. Preferably, an adhesion-enhancing agent may be added to the second binder before aging.

The inorganic coating composition for coating non-ferrous metal objects, prepared as described above, comprises: 33 to 37 wt % of liquid silica sol; 28 to 32 wt % of a powdery sealant; 19 to 21 wt % of liquid isopropyl alcohol; 6 to 8 wt % of powdery graphene; 4 to 6 wt % of a powdery filler; and 2 to 4 wt % of a powdery pigment.

Figure 2:
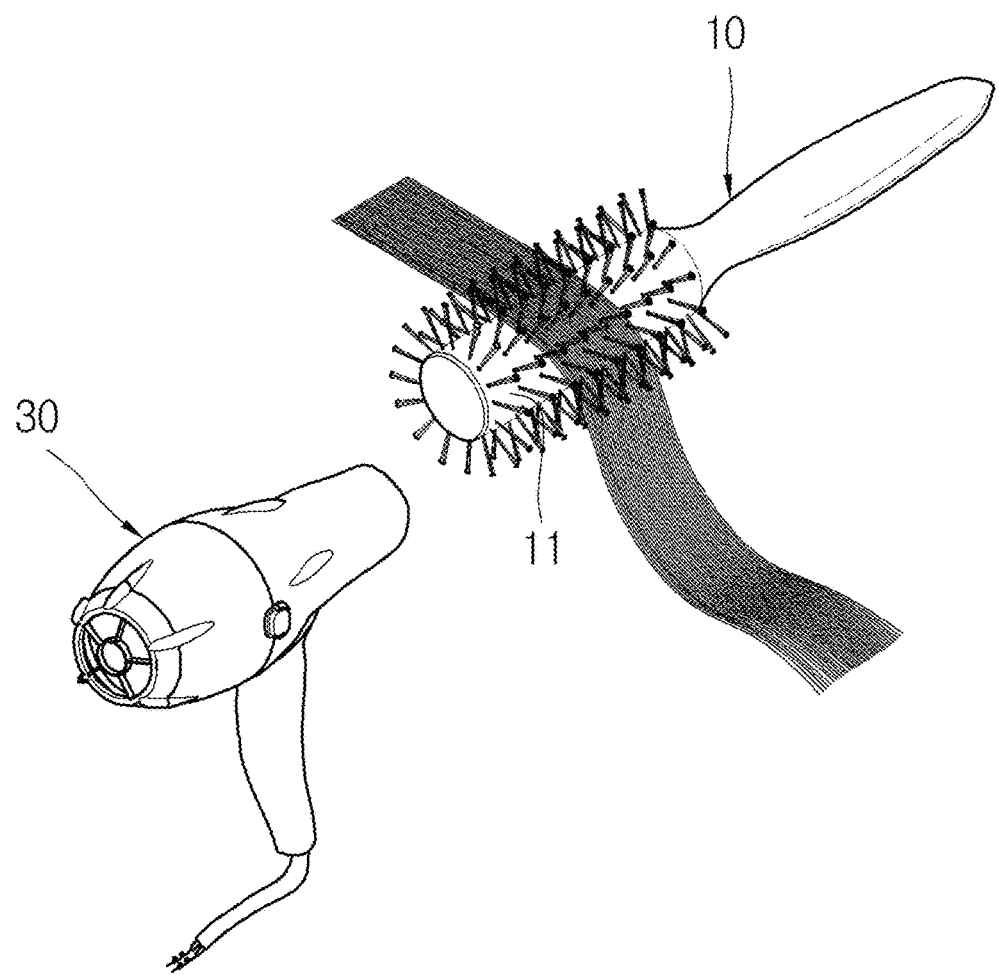
FIG. 2 is a perspective view illustrating a state in which a hairbrush coated with an inorganic coating composition according to the present invention is used.
Figure 3:
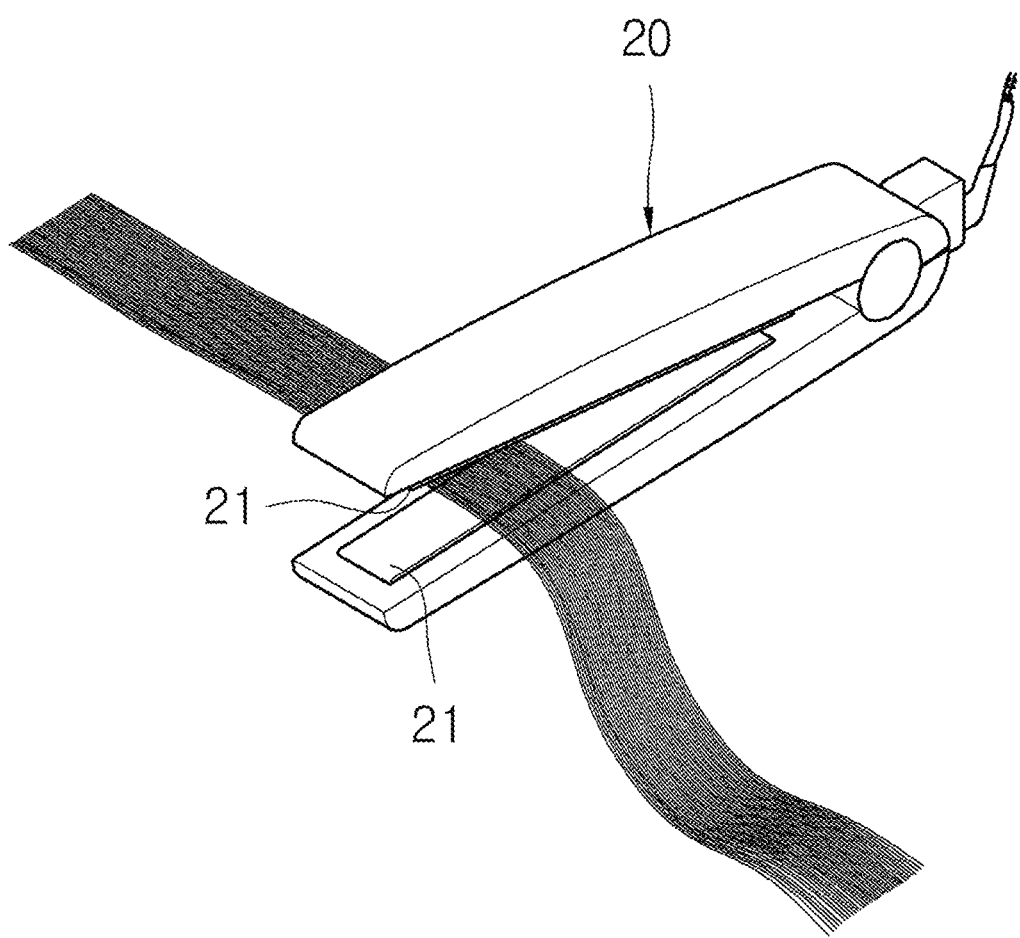
FIG. 3 is a perspective view illustrating a state in which a hair iron coated with an inorganic coating composition according to the present invention is used.

As shown in FIG. 2, the inorganic coating composition for coating non-ferrous metal objects, prepared as described above, is used to coat an aluminum metal pipe 11 forming the cylindrical barrel of a hairbrush 10. Alternatively, as shown in FIG. 3, the inorganic coating composition is used to coat an aluminum heat transfer plate 21 in a hair iron 20.

Thus, when hair is curled by winding the hair around the aluminum metal pipe 11 of the hairbrush 10, heat generated by the heater of the hair dryer 30 is transferred to the hair through the metal pipe 11 having a very high thermal conductivity. The aluminum heat transfer plate 21 of the hair iron 20 also has excellent thermal conductivity, and thus is heated quickly. Therefore, a hair curling operation of waving the hair or an operation of straightening and curling the hair can be efficiently performed, and the hair can be styled to the user's desire.

Figure 4:
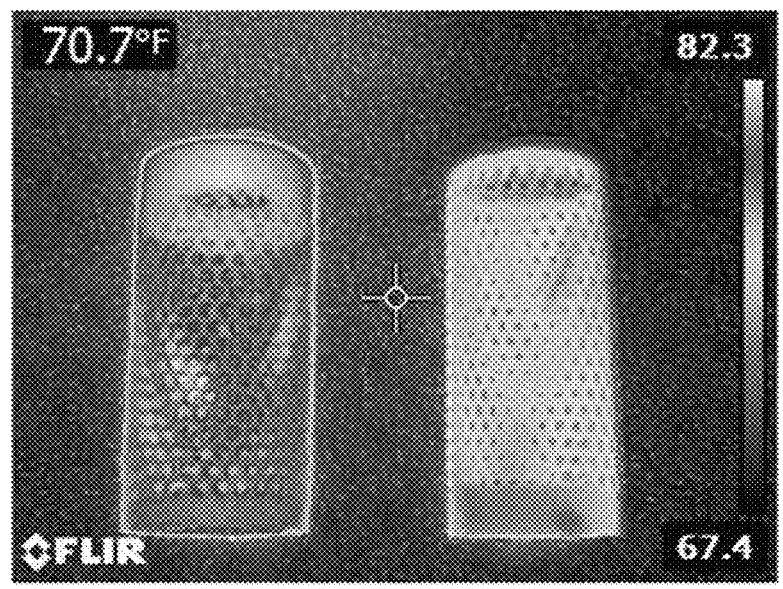
FIGS. 4 and 5 are close-up thermal images of a metal barrel coated with an inorganic coating composition according to the present invention and a metal barrel coated with a conventional coating composition, respectively, acquired after heating of the metal barrels.
Figure 5:
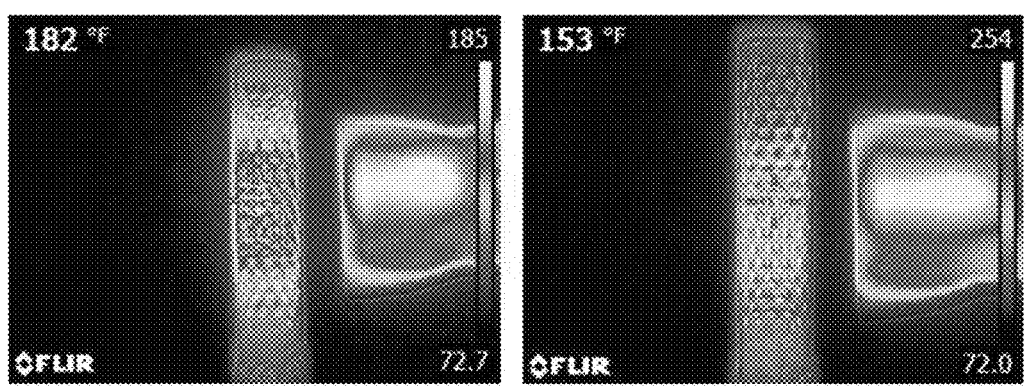

Meanwhile, as shown in FIG. 4, each of a metal barrel coated with a graphene-containing inorganic coating composition according to the present invention and a metal barrel coated with a conventional coating composition was heated by a hair drier, and after 60 seconds, was photographed at a distance of 1 inch. As a result, it could be seen that the metal barrel coated with the inorganic coating composition according to the present invention showed a uniform temperature distribution compared to the metal barrel coated with the conventional coating composition. In addition, as shown in FIG. 5, it could be seen that the temperature of the metal barrel coated with the inorganic coating composition according to the present invention was about 20% higher than that of the metal barrel coated with conventional coating composition, due to its high thermal conductivity.

Therefore, the aluminum barrel or aluminum heat transfer plate coated with the inorganic coating composition according to the present invention emits far-infrared rays and anions beneficial to the human body, due to the silica sol component, and thus has good effects on the scalp and hair during hair curling or straightening. Furthermore, the strength of the entire non-ferrous metal can be maximized by the graphene component. In addition, since the aluminum metal pipe 11 or the heat transfer plate 21 is quickly heated due to its excellent thermal conductivity, the hair curling operation of waving the hair or the operation of straightening and curling the hair can be efficiently achieved, allowing the hair to be styled to the desired shape.

In addition, when hair is curled by winding the hair around the aluminum metal pipe 11 of the hairbrush 10, hair styling can be efficiently achieved, since radiant heat is emitted along with strong far-infrared ray emission due to the graphene and silica sol component and has very excellent thermal conductivity. Furthermore, because the inorganic coating composition of the present invention contains the thermopaint that change color at a temperature of 40° C. to 70° C., the user can perform the hair styling operation after confirming that the color of the coating layer was changed due to heat transfer from the hair drier to the metal barrel, indicating that the hair styling operation is very conveniently performed. In addition, since overheating of the metal barrel can be detected by a change in color of the metal barrel, damage to hair can be prevented and the hair styling operation can be performed with safety.

As described above, the aluminum barrel or aluminum heat transfer plate coated with the inorganic coating composition according to the present invention emits far-infrared rays and anions beneficial to the human body, due to the silica sol component, and thus has good effects on the scalp and hair during hair styling. Furthermore, the strength of the entire non-ferrous metal can be maximized by the graphene component. In addition, since the aluminum metal pipe 11 or the heat transfer plate 21 is quickly heated due to its excellent thermal conductivity, the hair curling operation of waving the hair or the operation of straightening and curling the hair can be efficiently performed, allowing the hair to be styled to the desired shape. Therefore, the inorganic coating composition for coating non-ferrous metal objects according to the present invention has high competitiveness and is highly functional.

Although the preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A graphene-containing inorganic coating composition for coating non-ferrous metal objects, the composition comprising: 33 to 37 wt % of liquid silica sol; 28 to 32 wt % of a powdery sealant; 19 to 21 wt % of liquid isopropyl alcohol; 6 to 8 wt % of powdery graphene; 4 to 6 wt % of a powdery filler; and 2 to 4 wt % of a powdery pigment.

* * * * *